US010780755B2

(12) United States Patent
Pavesio et al.

(10) Patent No.: US 10,780,755 B2
(45) Date of Patent: Sep. 22, 2020

(54) OSCILLATING ARM OF A MOTOR-VEHICLE SUSPENSION

(71) Applicant: C.R.F. Società Consortile per Azioni, Orbassano (Turin) (IT)

(72) Inventors: Carlo Pavesio, Turin (IT); Andrea Crosetti, Turin (IT); Sara Di Lisio, Orbassano (IT); Silvano Sandri, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 87 days.

(21) Appl. No.: 16/126,447

(22) Filed: Sep. 10, 2018

(65) Prior Publication Data
US 2019/0077206 A1    Mar. 14, 2019

(30) Foreign Application Priority Data
Sep. 13, 2017    (EP) .................................... 17190757

(51) Int. Cl.
*B60G 3/20*    (2006.01)
*B60G 7/02*    (2006.01)
(Continued)

(52) U.S. Cl.
CPC ................ *B60G 3/20* (2013.01); *B60G 3/14* (2013.01); *B60G 7/001* (2013.01); *B60G 7/008* (2013.01); *B60G 7/02* (2013.01); *B60G 2200/13* (2013.01); *B60G 2204/143* (2013.01); *B60G 2204/148* (2013.01); *B60G 2206/012* (2013.01); *B60G 2206/013* (2013.01); *B60G 2206/12* (2013.01);
(Continued)

(58) Field of Classification Search
CPC . B60G 3/20; B60G 7/008; B60G 3/14; B60G 7/001; B60G 7/02; B60G 2204/143; B60G 2206/124; B60G 2206/12; B60G 2206/013; B60G 2204/148; B60G 2200/13; B60G 2206/7101; B60G 2206/16; B60G 2206/7104; B60G 2206/012; B60G 2206/70; B60G 2206/821
See application file for complete search history.

(56) References Cited

U.S. PATENT DOCUMENTS 2,121,806 A  *  6/1938  Leighton ................... B60G 3/20
                                                  280/124.134
3,737,174 A  *  6/1973  Hickman ................. B60G 7/02
                                                  280/124.177
(Continued)

FOREIGN PATENT DOCUMENTS

DE    202009006962 U1    7/2009
EP         1688279 A1    8/2006
(Continued)

OTHER PUBLICATIONS

European Search Report dated Feb. 27, 2018 for EP App. No. 17 190 757.9. 3 pages.

*Primary Examiner* — Drew J Brown
(74) *Attorney, Agent, or Firm* — RMCK Law Group PLC

(57) ABSTRACT

It is herein described an oscillating arm for a motor-vehicle suspension having a first rod element and a second rod element. The second rod element is a half-shell rod that provides a cavity. The oscillating arm also comprises at least one insert, made of plastic or fiber-reinforced composite material, which fills the cavity of the half-shell rod.

9 Claims, 9 Drawing Sheets

(51) Int. Cl.
*B60G 7/00* (2006.01)
*B60G 3/14* (2006.01)
(52) U.S. Cl.
CPC .... *B60G 2206/124* (2013.01); *B60G 2206/16* (2013.01); *B60G 2206/70* (2013.01); *B60G 2206/7101* (2013.01); *B60G 2206/7104* (2013.01); *B60G 2206/821* (2013.01)

(56) References Cited

U.S. PATENT DOCUMENTS

| | | | | |
|---|---|---|---|---|
| 3,850,437 | A | * | 11/1974 | Owen ................ B60G 17/052 280/6.157 |
| 2007/0278778 | A1 | * | 12/2007 | Tanaka ................ B60G 7/02 280/788 |
| 2019/0283561 | A1 | * | 9/2019 | Battaglia ................ B60G 7/001 |

FOREIGN PATENT DOCUMENTS

| | | |
|---|---|---|
| FR | 3036065 A1 | 11/2016 |
| WO | 2008015636 A2 | 2/2008 |
| WO | 2011072889 A1 | 6/2011 |

\* cited by examiner

OSCILLATING ARM OF A MOTOR-VEHICLE SUSPENSION

CROSS-REFERENCE TO RELATED APPLICATION

This application claims priority to European Patent Application No. 17 190 757.9 filed Sep. 13, 2017. The disclosure of the above application is incorporated herein by reference in its entirety.

FIELD OF THE INVENTION

The present invention relates to motor-vehicle wheel suspensions and relates, in particular, to an oscillating suspension arm.

Documents FR 303 60 65 A1, WO 2011 072 889 A1 and EP 168 82 79 A1 disclose solutions wherein an oscillating arm comprises a component for reinforcing an half-shell rod.

The present invention proceeds from the desire to further improve the structural characteristics of suspension arms respect to conventional solutions that are currently commercially available.

OBJECT OF THE INVENTION

The object of the present invention is to provide an oscillating suspension arm of the above type which results extremely lightweight and, at the same time, with characteristics of rigidity and strength necessary to withstand the stresses to which the oscillating arms are subjected to during the operating steps of the motor-vehicle.

Another object of the invention is to provide a suspension arm with a relatively simple and economical structure to manufacture.

Another object of the invention is to provide an oscillating arm in which the support area for a suspension spring can be easily modified.

A further object is to provide a suspension arm which has an adaptable structure for being easily implemented on different classes of motor-vehicle.

SUMMARY OF THE INVENTION

In view of achieving the aforesaid objects, the present invention relates to an oscillating arm of a motor-vehicle suspension comprising a first rod element and a second rod element, wherein:

said second rod element is a half-shell rod which provides a cavity, said first rod element is a tubular rod that has a portion that passes within said half-shell rod, said oscillating arm comprises also at least one insert made of plastic or composite material reinforced with fibers, which fills said cavity of said half-shell rod, said oscillating arm comprises also a first seat configured to receive a spring of said motor-vehicle suspension, said first seat is arranged on said composite insert attached with said half-shell rod, said half-shell rod having a hollow portion to enable provision of said spring at said first seat.

According to a preferred embodiment of the oscillating arm of the invention, said arm comprises also a second seat configured to receive a pad of said motor-vehicle suspension, said pad being intended to be fixed to the floor of the body of said motor-vehicle, said second seat being arranged on said composite insert attached with said half-shell rod, said half-shell rod having a hollow portion to enable provision of said pad at said second seat.

DESCRIPTION OF EMBODIMENTS

Further characteristics and advantages of the invention will become apparent from the description that follows with reference to the attached drawings, provided purely by way of non-limiting example, wherein.

Figure 1:
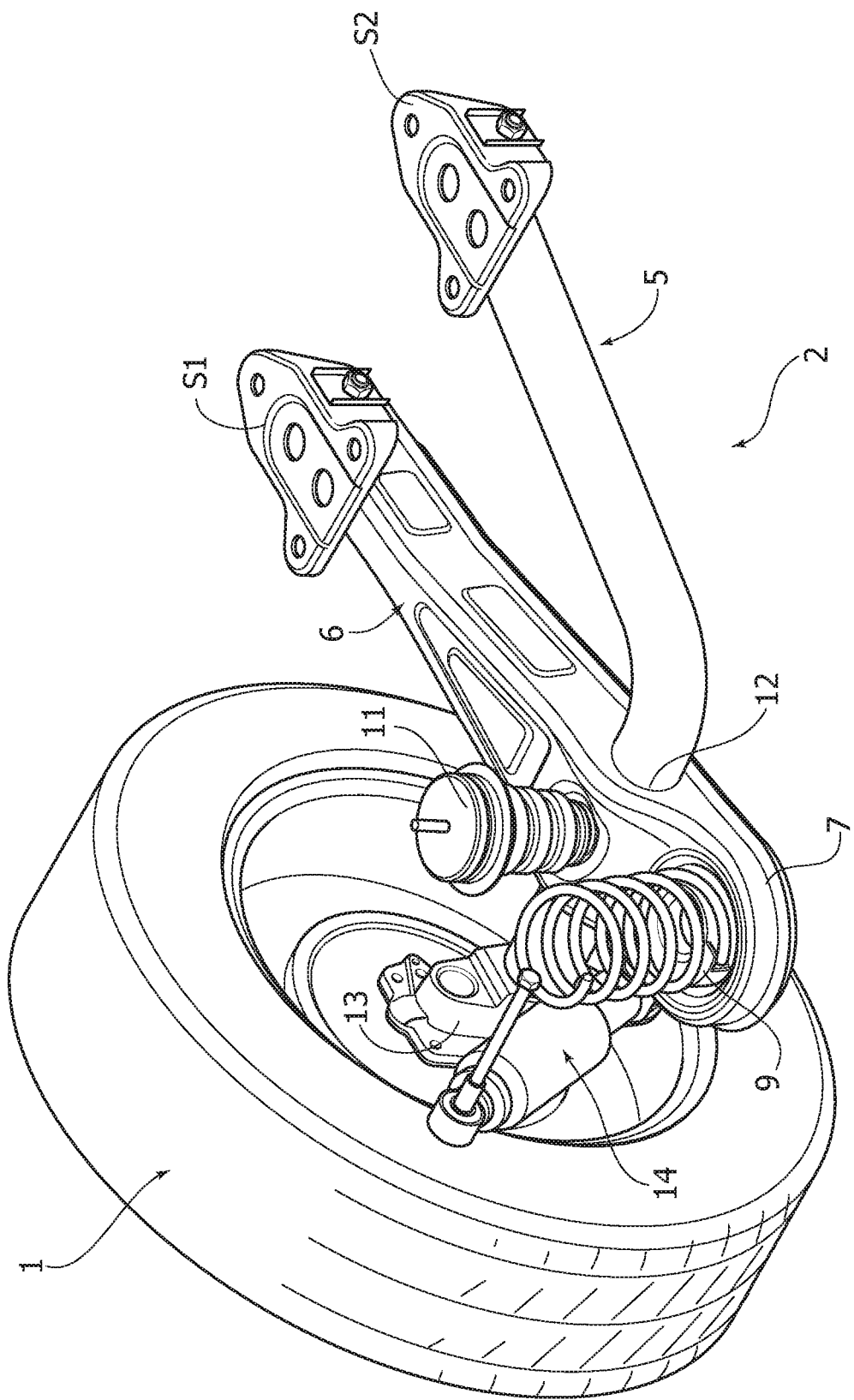
FIG. 1 illustrates a perspective view of a first embodiment of an oscillating arm of a motor-vehicle rear suspension according to the present invention, associated with a motor-vehicle wheel.

In the following description various specific details are illustrated aimed at a thorough understanding of the embodiments. The embodiments can be implemented without one or more of the specific details, or with other methods, components, materials, etc. In other cases, known structures, constructive details, materials or operations are not illustrated and described in detail, since they can be produced in any known way and also because they do not fall within the scope of the present invention.

It is also understood that in the following description, only the elements useful for understanding the invention are described, for example, assuming that the motor-vehicle wheel suspension, which includes arms according to the invention, comprises all the elements known per se for operation.

In the attached drawings, reference 2 indicates an oscillating arm, according to the present invention, of a motor-vehicle rear suspension.

The oscillating arm 2 comprises a first rod element 5 and a second rod element 6. The first rod element 5 is a tubular rod and the second rod element 6 is a half-shell rod which provides a cavity C2.

With reference to the manner in which the rods 5, 6 provide the arm structure 2, the tubular rod 5 has a portion 12 welded to and passing within an intermediate portion of the half-shell rod 6 (see FIGS. 1-3 and 8-9).

According to an essential characteristic of the present invention, the arm 2 further comprises an insert 4 of plastic material or composite material reinforced with fibers that fills the cavity C2 of the half-shell rod 6.

By adopting a plastic insert or fiber-reinforced composite material configured to fill the half-shell structure, the suspension arm according to the invention has an extremely lightweight structure and, at the same time, has the necessary strength and rigidity characteristics to support the stresses that a vehicle suspension is subjected to during the operating steps.

Figure 2:
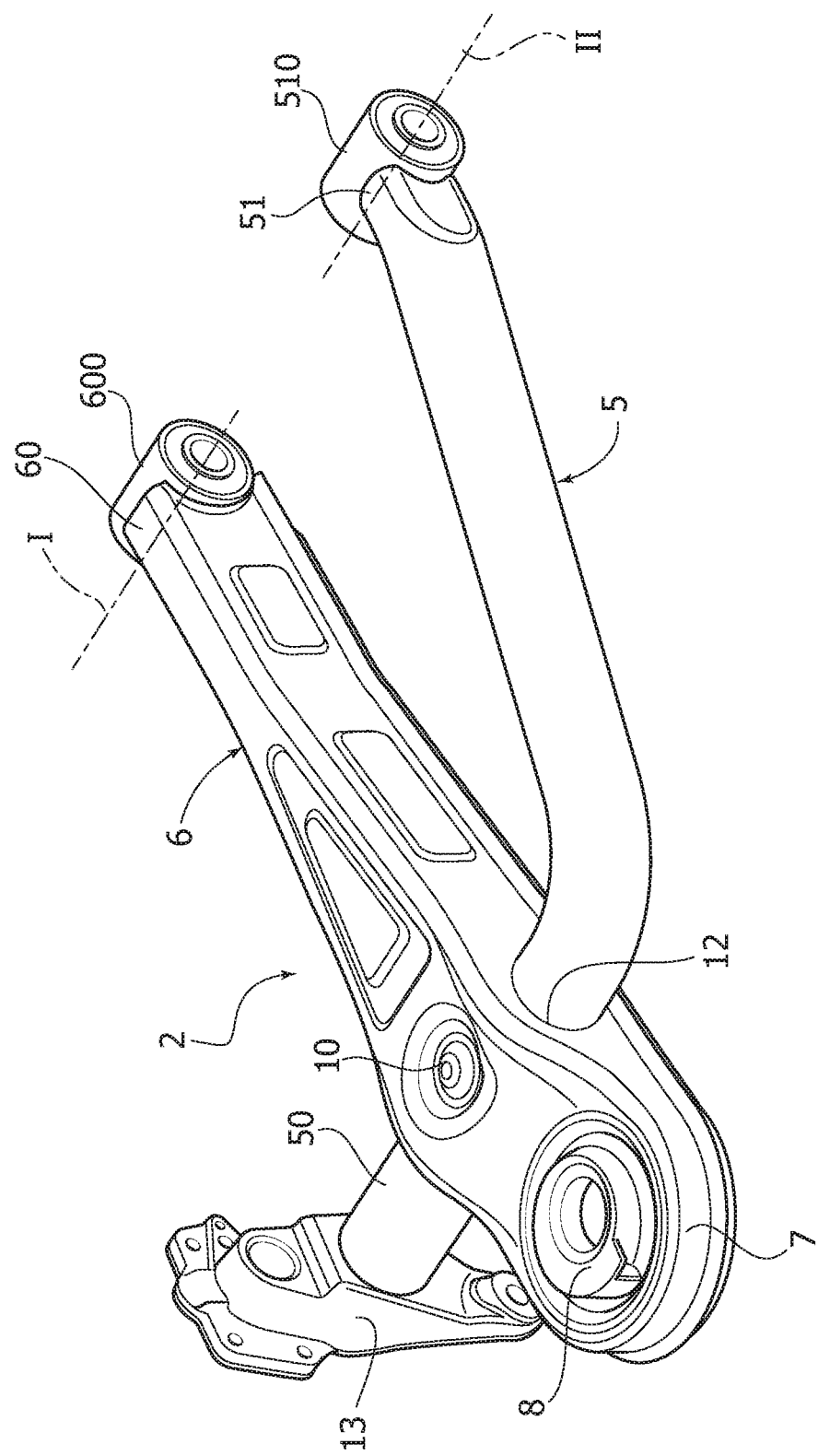
FIGS. 2 and 3 are two perspective views of the suspension arm illustrated in FIG. 1.
Figure 3:
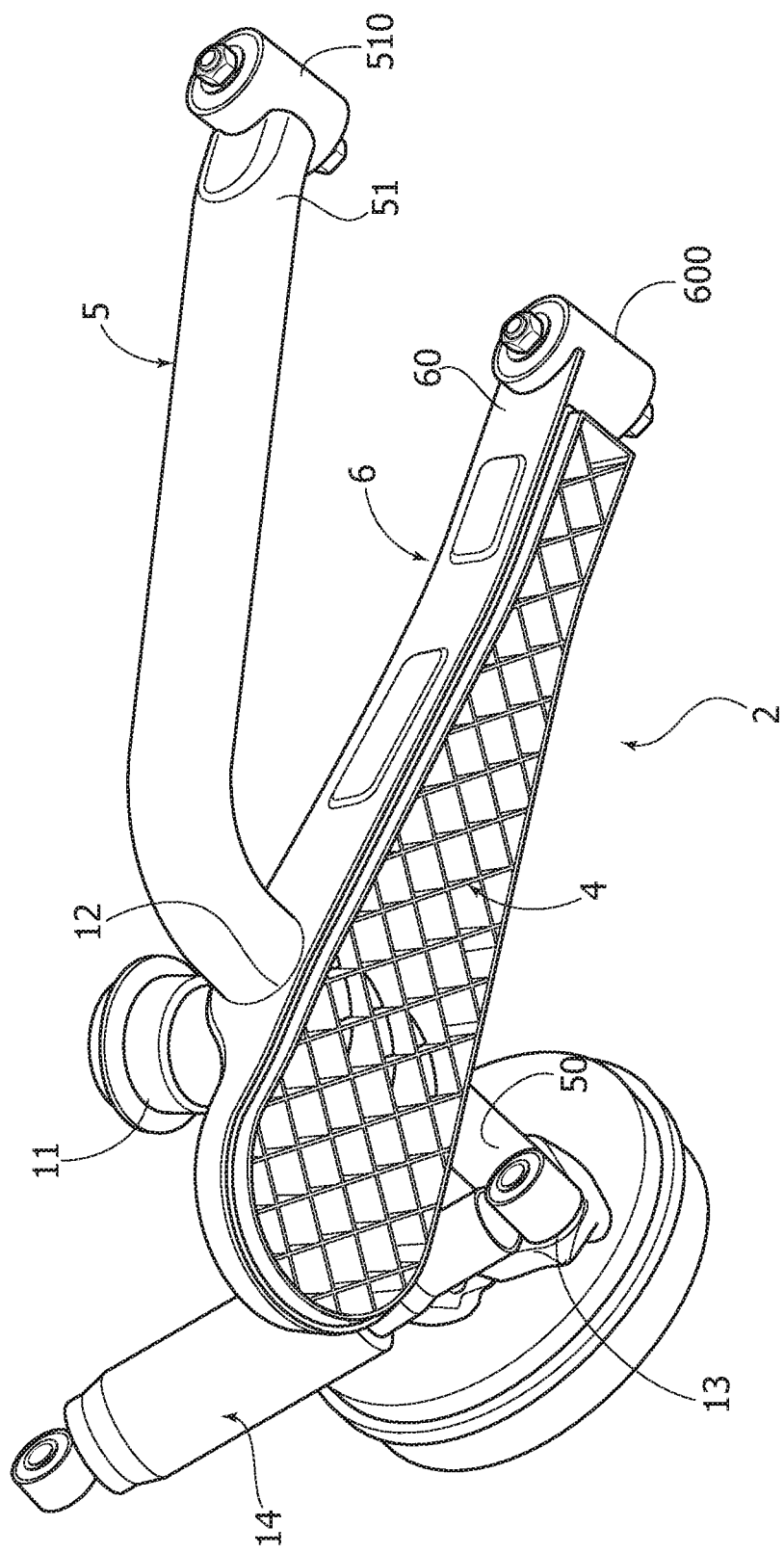

As illustrated in FIGS. 1-3, which show a first embodiment of the invention, the first rod element 5 is a tubular rod having an essentially L-shaped profile, so that the tubular rod 5 and the half-shell rod 6 define an oscillating arm structure 2 with an essentially triangular shape.

With reference to FIGS. 2, 3, the tubular rod 5 has a first end 50 connected to a wheel support 13 of the motor-vehicle and has a terminal portion 51, opposite to the first end 50, with a bushing seat 510 intended to be connected to the body of said motor-vehicle in an oscillating manner by means of an elastic bushing. According to a known motor-vehicle suspension structure, a shock absorber 14 is connected to the wheel support 13 which supports a wheel 1 (FIG. 1).

Again with reference to FIGS. 2-3, the half-shell rod 6 also has a terminal portion 60 with a bushing seat 600 intended to be connected to the body of the motor-vehicle, in an oscillating manner by means of an elastic bushing. The bushing seats 510, 600 have essentially coincident main axes I, II. The orientation of these axes is chosen in such a way as to obtain the best performance tradeoff. The terminal portions 51, 60 of the rods 5, 6 are designed to be connected to the body of a motor-vehicle by means of two connecting brackets S, S1 (FIG. 1).

The oscillating arm structure described above has the advantage of being easily adaptable to be implemented on different classes of motor-vehicle, since it is sufficient to vary the length of the portion 12 of the tubular rod 5, depending on the vehicle class on which the oscillating arm according to the invention is intended to be installed.

As mentioned above, the rear oscillating arm 2 comprises a plastic or composite-fiber insert 4 configured to fill a cavity C2 formed by the half-shell rod 6. The insert 4 illustrated in the drawings has a honeycomb structure (FIG. 3) but, of course, it can also be made according to other shapes and sizes (for example, with a lamellar structure).

In view of attaching the insert 4 within the cavity C2 of the half-shell rod 6, the insert 4 is co-molded with the half-shell portion of the arm 2 and/or comprises adhesive material.

Figure 5:
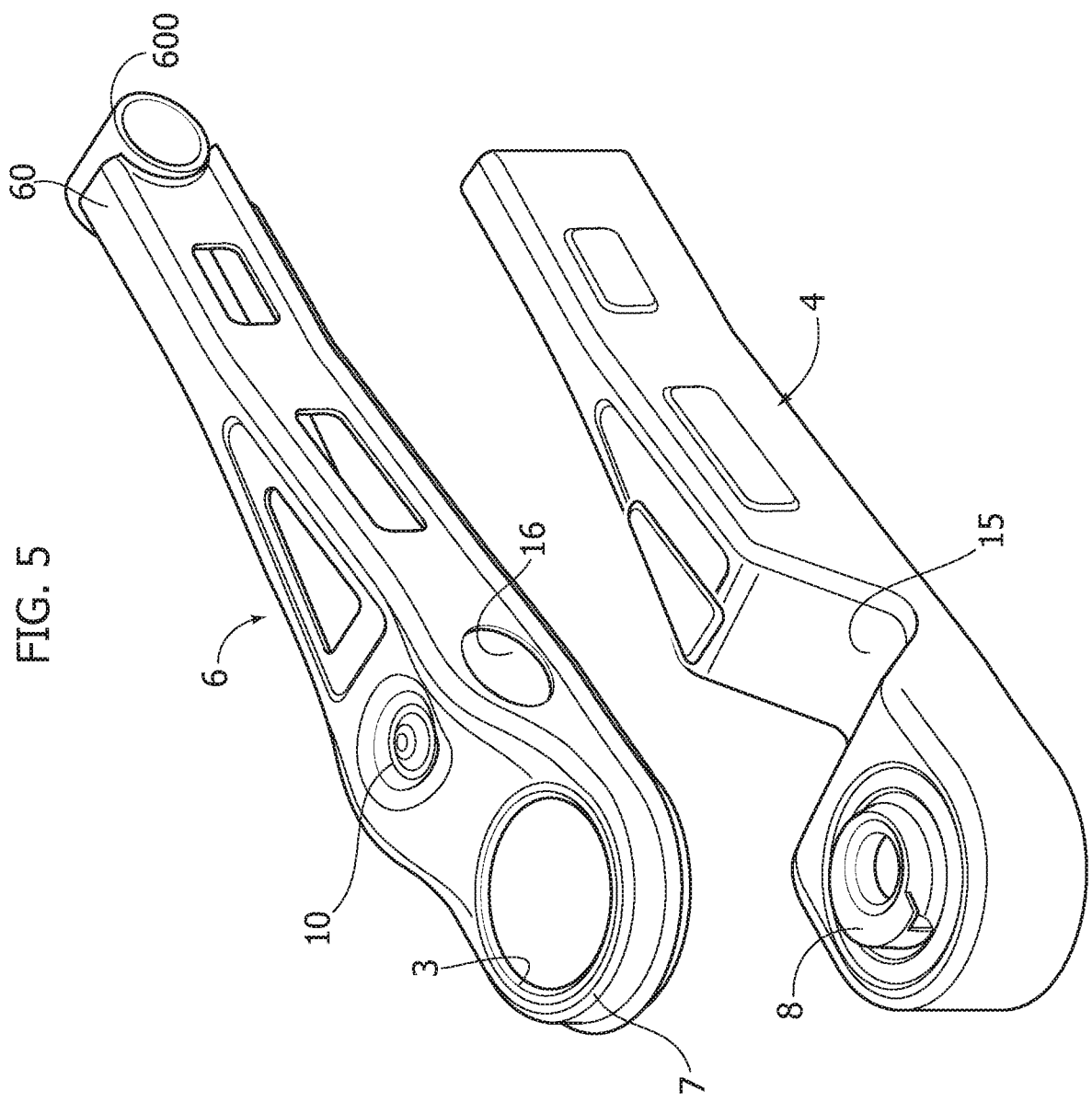
Figure 6:
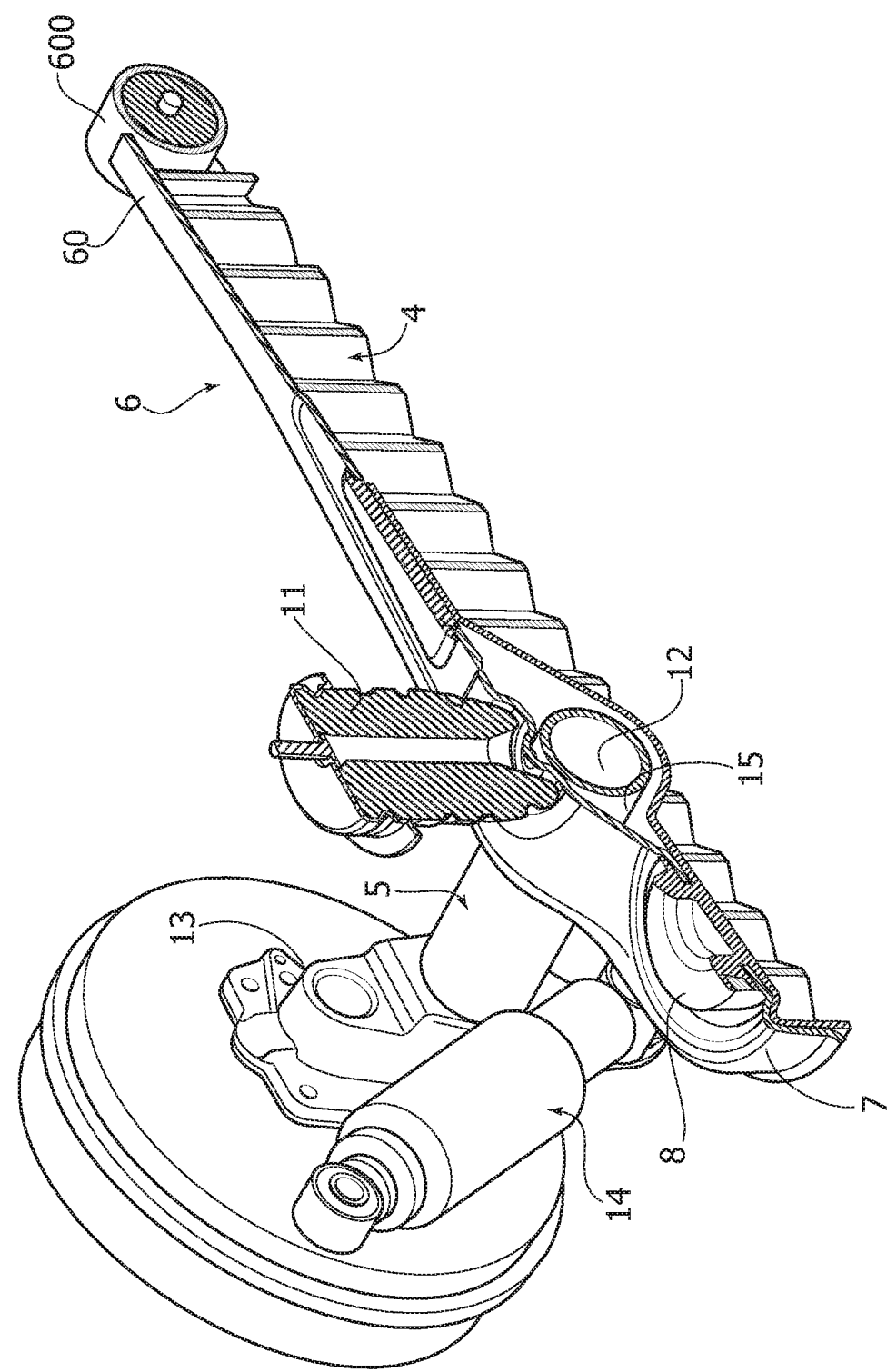
FIG. 6 illustrates a transversal cross-sectional view of the oscillating arm portion illustrated in FIG. 5, associated with components of a motor-vehicle suspension.

Specifically with reference to the exploded view of FIG. 5 illustrating the half-shell rod 6 and the insert 4, the latter has a grooved portion 15 so as to allow the passage of the portion 12 of the tubular rod 5 into a hole 16 of the half-shell rod 6.

Figure 4:
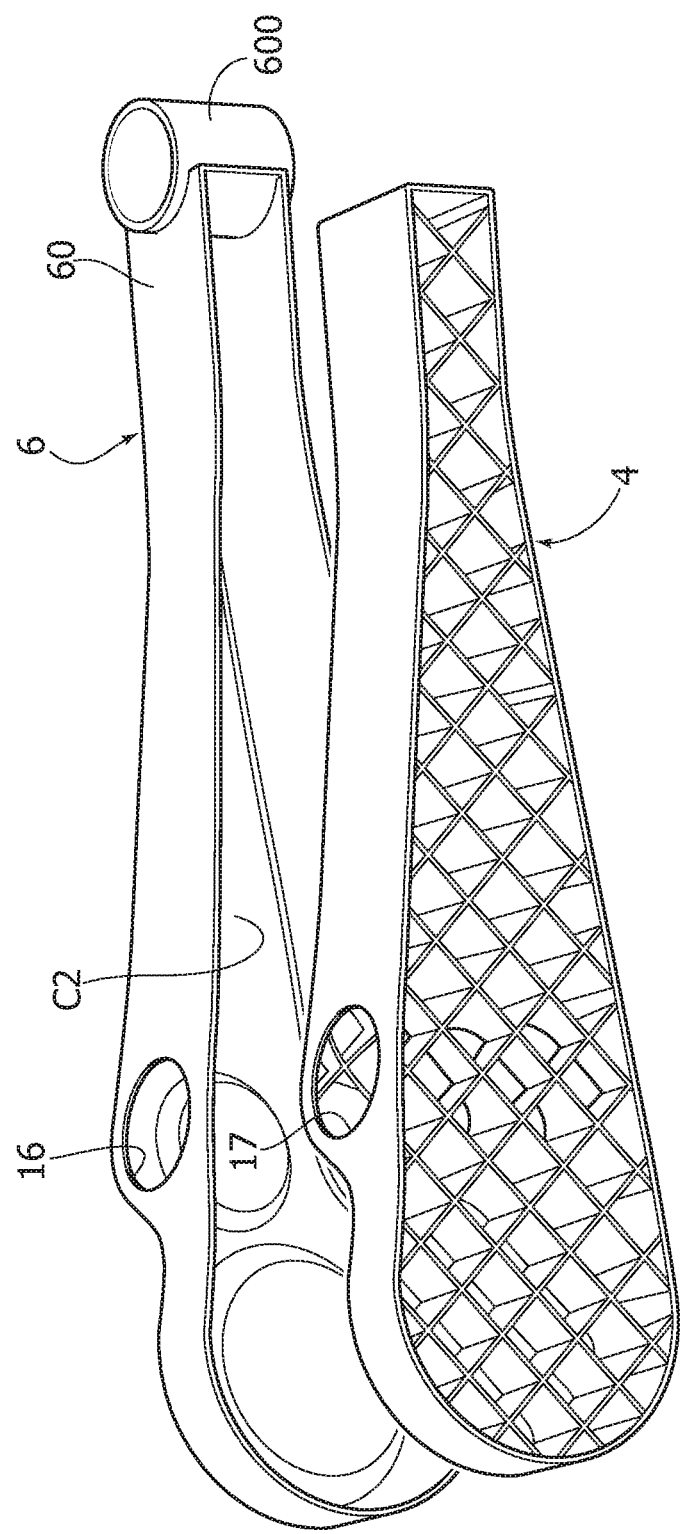
FIGS. 4, 5, 7 illustrate three exploded perspective views of a portion of the oscillating arm of FIGS. 1-3 according three variants.

Alternatively to the grooved portion 15, the insert 4 can have a hole 17 at its side walls (FIG. 4).

The feature of providing the insert with a grooved portion instead of a hole, for enabling passage of the tubular rod, allows to save material of the insert, thus obtaining cost and weight reduction.

According to the invention illustrated in the drawings, the oscillating arm 2 provides a first seat 8 configured to receive a suspension spring 9 of a motor-vehicle suspension and a second seat 10 provided for receiving a suspension pad 11. The pad 11 is intended to be fixed to the floor of the car body. The spring and pad materials associated with the oscillating arm 2 are made of steel and elastomeric material (e.g. Cellasto®), respectively.

In the embodiment of FIG. 2, the first seat 8 and the second seat 10 are provided on the half-shell rod 6. In particular the first seat 8 is provided at the end 7 of the half-shell rod 6, while the second seat 10 is located at an intermediate portion of the half-shell rod 6.

In the embodiment of FIG. 5, the aforesaid first seat 8 is arranged on the insert 4 intended to be attached with the half-shell rod 6. The half-shell rod 6 has a hollow portion 3 to allow the arrangement of the spring 9 that rests at the first seat 8. This feature enables the use of the same suspension arm for different classes of motor vehicles, by adapting only the composite insert attached to the half-shell rod.

Also, in view of the provision of the first seat 8 at the insert 4, it is possible to adopt suspension springs with different diameters, according to different types of motor-vehicles, by modifying only the insert 4 and without changing the half-shell rod 6, providing this latter with a hollow portion sufficiently large to be compatible with springs of different size.

Figure 7:
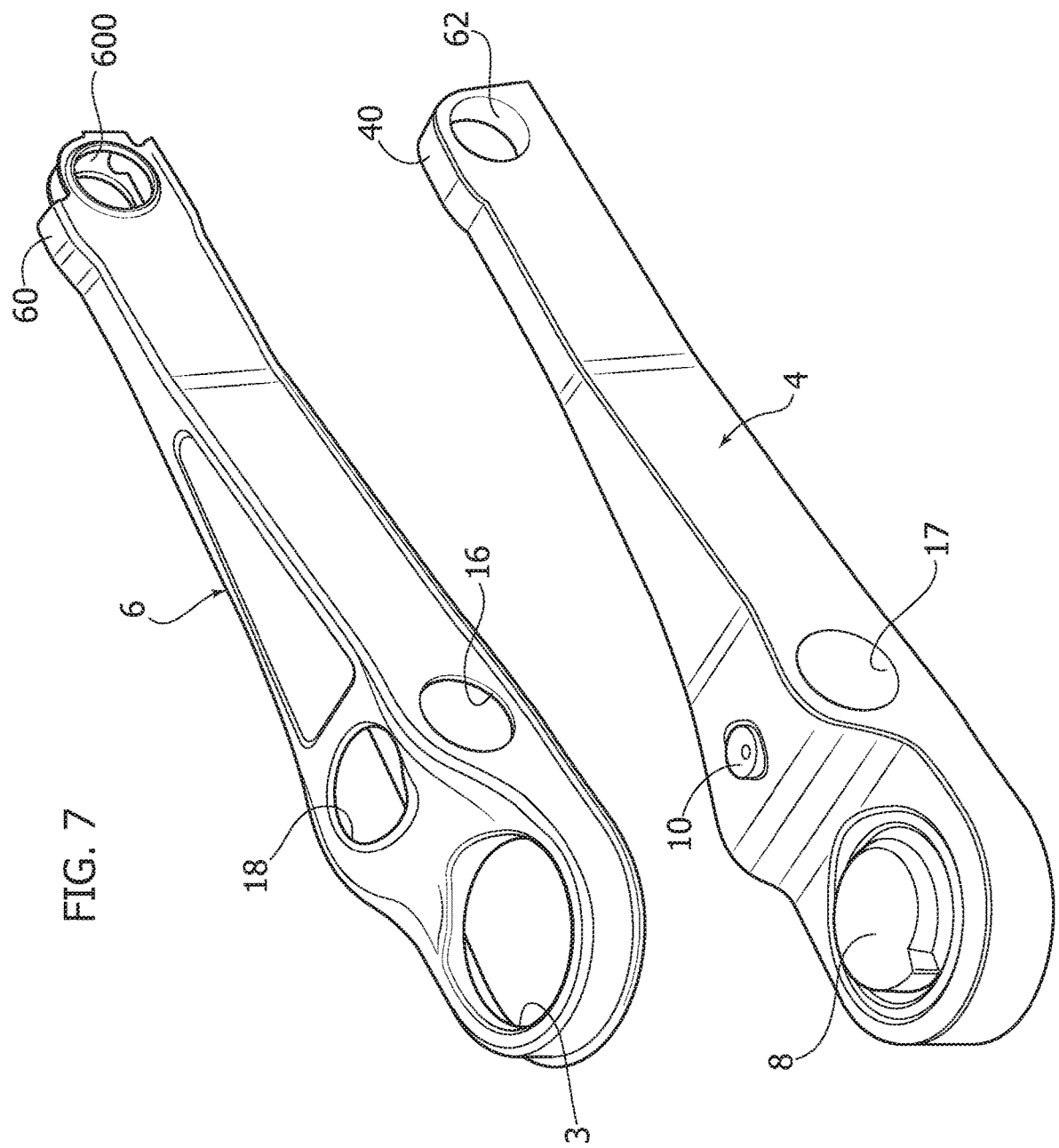

According to the embodiment of FIG. 7, also the second seat 10 is arranged on the insert 4 attached with said half-shell rod 6 and the half-shell rod 6 has a hollow portion 18 to enable provision of the pad 11 at the second seat 10.

Again with reference to the embodiment of FIG. 7, the insert 4 has a terminal portion 40 comprising a further bushing seat 62 for receiving an elastic bushing intended to be connected to the body of said motor-vehicle. The bushing seat 62 has the same axis of the bushing seat 600 provided at the terminal portion 60 of the half-shell rod 6. Thanks to this feature the retaining of the bushing with the oscillating arm is considerably improved.

According to a further embodiment of the invention illustrated in FIGS. 8-11, the first rod element 5 is a tubular rod having an essentially straight profile and having a portion passing within the half-shell rod 6 which provides an essentially triangular shape.

In order to attach the oscillating arm 20 to a motor-vehicle body, the triangular half-shell rod 6 provides two terminal ends 200, 201 including respective bushing seats 202, 203 in order to connect the arm 20 to the motor-vehicle body in an oscillating manner.

Figure 8:
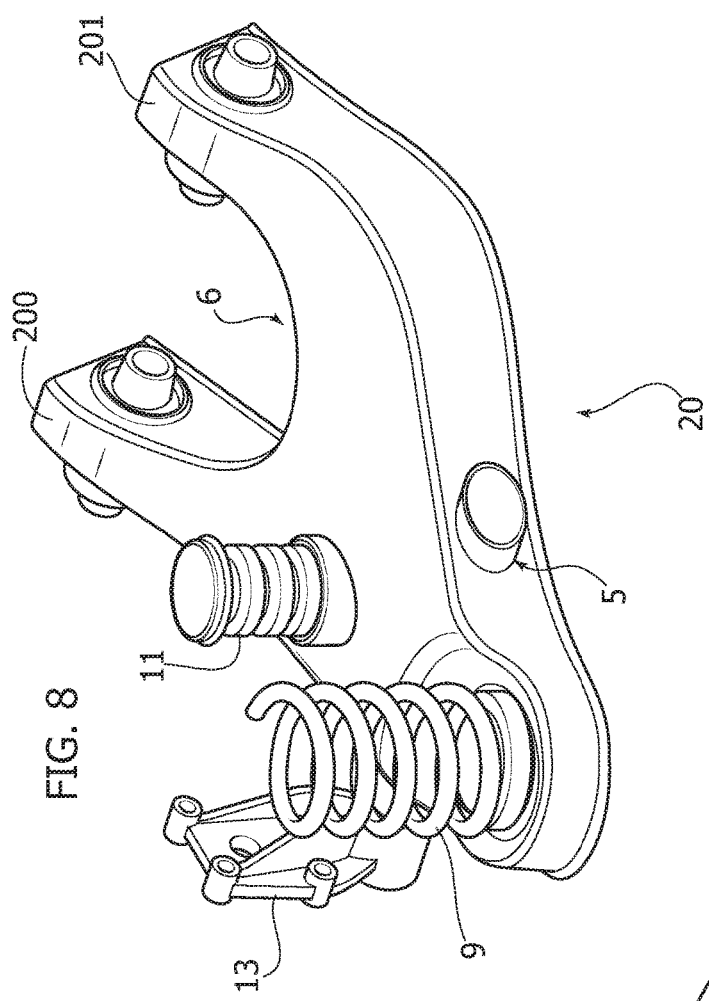
FIGS. 8-10 show perspective views of a further embodiment of an oscillating arm of a motor-vehicle rear suspension according to the present invention.
Figure 9:
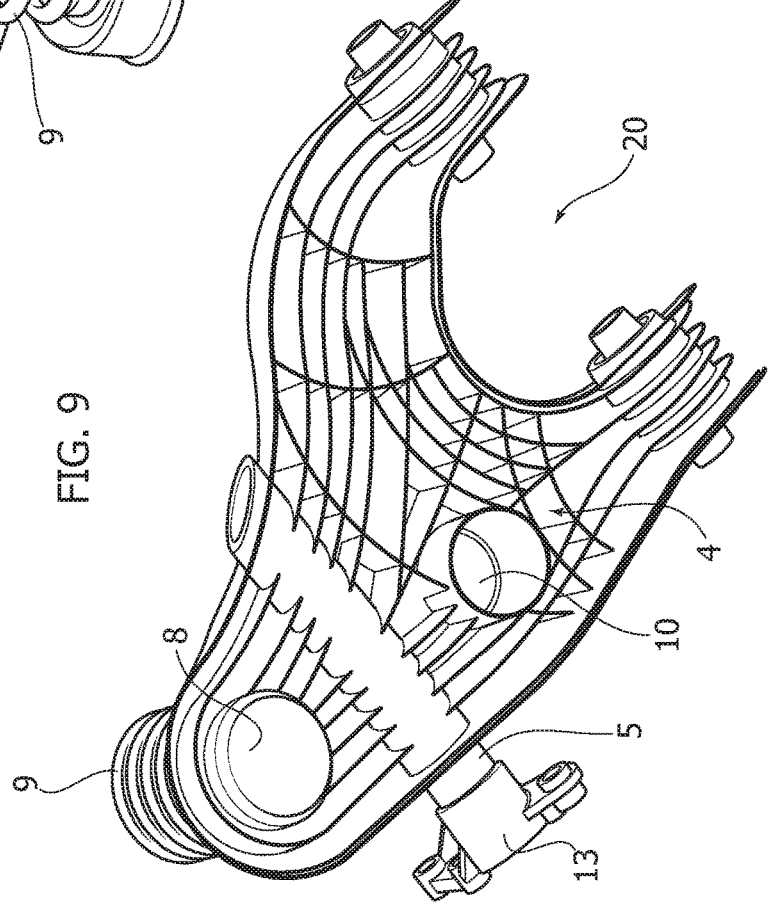
Figure 10:
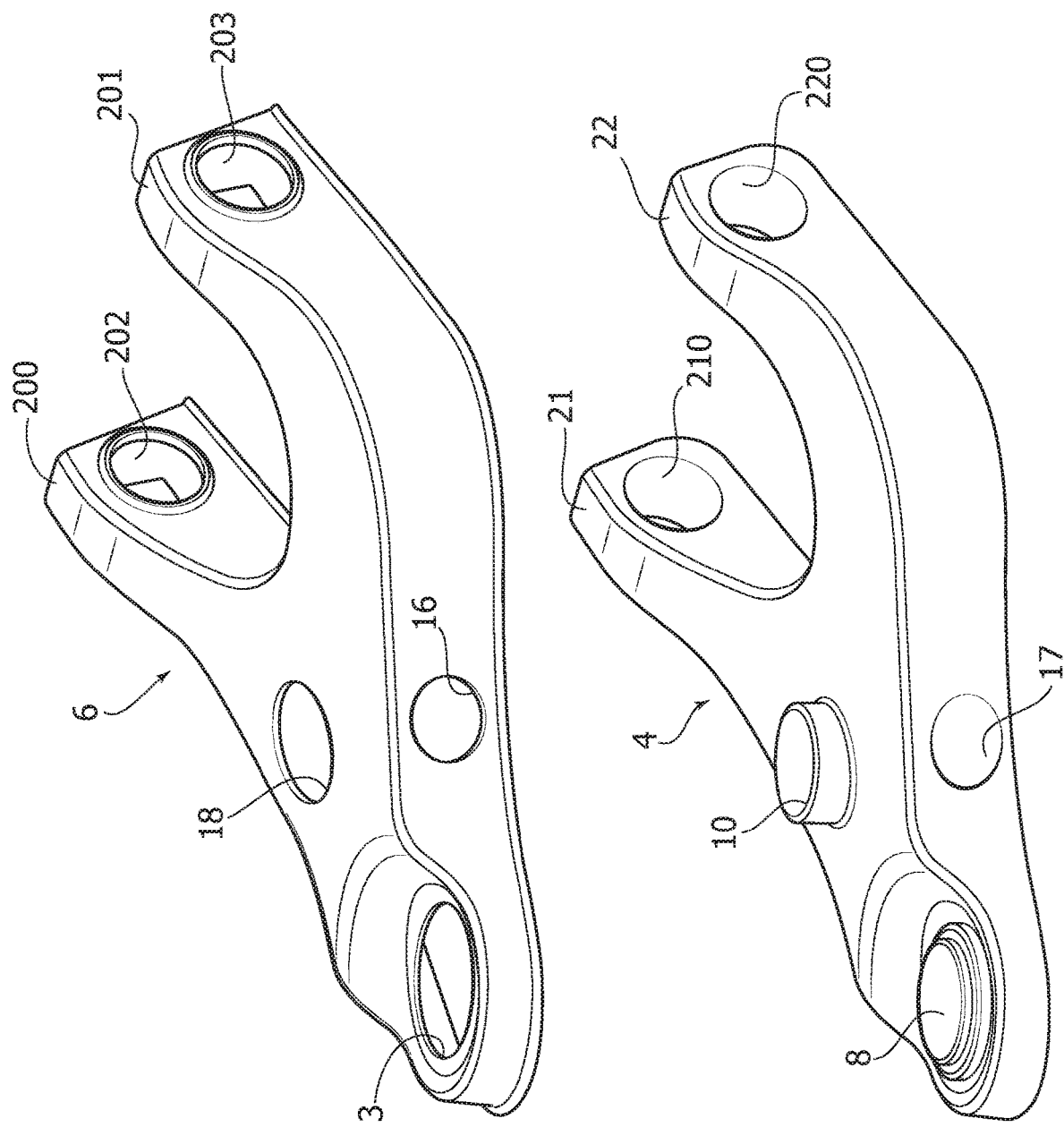

In the embodiment illustrated in FIG. 8-10, the first seat 8 and the second seat 10 are provided on the half-shell rod 6 and the insert 4 provides two terminal ends 21, 22 including bushing seats 210, 220.

Specifically with reference to the exploded view of FIG. 10 illustrating the half-shell rod 6 and the insert 4, the latter has a hole 17 so as to allow the passage of the portion 12 of the tubular rod 5 into a hole 16 of the half-shell rod 6.

The oscillating arm 2 according to the invention enables achievement of several advantages:

the oscillating suspension arm results extremely light-weight and, at the same time, with characteristics of rigidity and strength necessary to withstand the stresses to which the oscillating arms are subjected to during the operating steps of the motor-vehicle;

the oscillating suspension arm provides a relatively simple and economical structure to manufacture;

the support area for a suspension spring and/or a suspension pad can be easily modified.

the oscillating suspension arm provides an adaptable structure for being easily implemented on different classes of motor-vehicle.

Furthermore, the present invention is also directed at a rear suspension of a motor-vehicle comprising at least two oscillating arms, each having the above-mentioned characteristics.

Of course, without prejudice to the principle of the invention, the details of construction and the embodiments may vary widely with respect to those described and illustrated purely by way of example, without departing from the scope of the present invention.

What is claimed is:

1. An oscillating arm of a motor-vehicle suspension, comprising:
a first rod element and a second rod element, said second rod element being a half-shell rod which provides a cavity, and said first rod element being a tubular rod that has a portion that passes within said half-shell rod, at least one insert made of plastic or composite material reinforced with fibers, which fills said cavity of said half-shell rod,
a first seat configured to receive a spring of said motor-vehicle suspension,
wherein said first seat is arranged on said at least one insert attached with said half-shell rod, said half-shell rod having a hollow portion to enable provision of said spring at said first seat, and
wherein said at least one insert has a grooved portion to enable the passage of said portion of said tubular rod passing within said half-shell rod.

2. The oscillating arm according to claim 1, wherein said tubular rod has a substantially L-shaped profile, in such a way that said tubular rod and said half-shell rod define an oscillating arm structure with a substantially triangular shape.

3. The oscillating arm according to claim 2, wherein said tubular rod and said half-shell rod have respective terminal portions configured to be connected to a body of said motor-vehicle in an oscillating manner, by elastic bushings with substantially coincident main axes located at respective bushing seats.

4. The oscillating arm according to claim 3, wherein said at least one insert has a terminal portion comprising a further bushing seat for receiving an elastic bushing configured to be connected to the body of said motor-vehicle.

5. The oscillating arm according to claim 2, wherein said tubular rod has a first end connected to a wheel support of said motor-vehicle, said first end being arranged in proximity to said portion passing within said half-shell rod.

6. The oscillating arm according to claim 1, wherein said half-shell rod has a second seat at its intermediate portion configured to receive a pad of said motor-vehicle suspension, said pad being configured to be fixed to a floor of a body of said motor-vehicle.

7. The oscillating arm according to claim 1, wherein said oscillating arm comprises a second seat configured to receive a pad of said motor-vehicle suspension, said pad being configured to be fixed to a floor of a body of said motor-vehicle,
said second seat is arranged on said at least one composite material insert attached with said half-shell rod, said half-shell rod having a hollow portion to enable provision of said pad at said second seat.

8. The oscillating arm according to claim 1, wherein said at least one insert is co-molded with said half-shell rod and/or comprises adhesive material so as to fix said at least one insert within said cavity.

9. A rear suspension of a motor-vehicle comprising two oscillating suspension arms of the motor-vehicle according to claim 1.

* * * * *